United States Patent
Kogure

(10) Patent No.: US 8,221,886 B2
(45) Date of Patent: Jul. 17, 2012

(54) AROMATIC POLYCARBONATE RESIN COMPOSITION, MOLDED BODY THEREOF FOR OPTICAL USE, AND LIGHT DIFFUSION FILM

(75) Inventor: Masami Kogure, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 218 days.

(21) Appl. No.: 12/528,727

(22) PCT Filed: Feb. 20, 2008

(86) PCT No.: PCT/JP2008/052850
§ 371 (c)(1),
(2), (4) Date: Aug. 26, 2009

(87) PCT Pub. No.: WO2008/108173
PCT Pub. Date: Sep. 12, 2008

(65) Prior Publication Data
US 2010/0105846 A1    Apr. 29, 2010

(30) Foreign Application Priority Data
Mar. 1, 2007 (JP) .................. 2007-051401

(51) Int. Cl.
*B32B 27/00* (2006.01)
*C08L 53/00* (2006.01)
*C08L 69/00* (2006.01)

(52) U.S. Cl. ........ 428/412; 428/522; 525/92 E; 525/148

(58) Field of Classification Search ............ 525/88, 525/92 D, 92 E, 219, 148; 428/500, 522, 428/412
See application file for complete search history.

(56) References Cited

U.S. PATENT DOCUMENTS

| | | | | |
|---|---|---|---|---|
| 5,284,916 A | * | 2/1994 | Drzewinski | 525/92 E |
| 2001/0014419 A1 | * | 8/2001 | Schubert | 429/185 |
| 2006/0028920 A1 | * | 2/2006 | Kojima et al. | 368/205 |
| 2009/0080079 A1 | * | 3/2009 | Kogure et al. | 359/599 |

FOREIGN PATENT DOCUMENTS

| | | | |
|---|---|---|---|
| CN | 1408767 A | | 4/2003 |
| CN | 1703651 A | | 11/2005 |
| JP | 2000 086844 | | 3/2000 |
| JP | 2000 086847 | | 3/2000 |
| JP | 2004 210915 | | 7/2004 |
| JP | 2004 210916 | | 7/2004 |
| JP | 2006 249288 | | 9/2006 |
| JP | 2006 257126 | | 9/2006 |
| JP | 2006-257127 | * | 9/2006 |
| JP | 2006 257127 | | 9/2006 |
| JP | 2007 039490 | | 2/2007 |
| WO | WO 2006/132092 | * | 12/2006 |

OTHER PUBLICATIONS

Takahashi et al., STN AN 2006:1006146, abstracting JP 2006257127, Sep. 2006.*
Takahashi et al., DERWENT acc-No. 2006-733510. Sep. 2006.*
Takahashi et al., electronic translation of specification of JP 2006-257127, Sep. 2006.*

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

Provided is an aromatic polycarbonate resin composition containing, with respect to 100 parts by mass of a resin mixture including 60 to 99 mass % of (A) an aromatic polycarbonate resin and 1 to 40 mass % of (B) a styrene-based resin, 1 to 30 parts by mass of a compatibilizer, the compatibilizer being formed of a block or random copolymer constituted of an aromatic vinyl monomer unit and an acrylate-based monomer unit. This aromatic polycarbonate resin composition has improved transparency and improved extrusion stability.

13 Claims, No Drawings

AROMATIC POLYCARBONATE RESIN COMPOSITION, MOLDED BODY THEREOF FOR OPTICAL USE, AND LIGHT DIFFUSION FILM

TECHNICAL FIELD

The present invention relates to an aromatic polycarbonate resin composition, a molded body of the composition for optical use, and a light diffusion film molded out of the composition. More specifically, the present invention relates to an aromatic polycarbonate resin composition which includes an aromatic polycarbonate resin, a styrene-based resin, and a specific compatibilizer, and is excellent particularly in transparency, extrusion stability, chemical resistance, flame retardance, heat resistance, and impact resistance, and to a molded body of the composition for optical use and a light diffusion film molded out of the composition.

BACKGROUND ART

Thermoplastic resins, in particular, engineering plastics are each known to have an excellent mechanical strength and an excellent impact strength as well as excellent heat resistance. Of those, a polycarbonate resin has been finding use in a variety of fields typified by automobile parts, home appliance parts, OA system parts, and information recording media because the resin has the following characteristics in addition to the above properties: the resin is transparent and excellent in flame retardance. However, the polycarbonate resin having such characteristics has the following drawback: the resin is poor in chemical resistance. Accordingly, the following problem was present: a resin capable of simultaneously satisfying all of such sophisticated properties of an engineering plastic resin, transparency, and chemical resistance cannot be obtained. To overcome this problem, a blend of the polycarbonate resin and a syndiotactic polystyrene-based resin has been known (see, for example, Patent Documents 1 and 2).

However, such binary system including an aromatic polycarbonate resin and the syndiotactic polystyrene-based resin as described in Patent Document 1 inevitably has the following drawbacks: the syndiotactic polystyrene-based resin has insufficient dispersing performance, so a product obtained by the extrusion molding of the system shows large fluctuations in its width and thickness, and the productivity of the product is poor.

In addition, a polycarbonate resin has been recently finding use in the fields of optical functional films typified by an LCD field. However, the polycarbonate resin has a high optical stress coefficient, and is apt to cause birefringence owing to distortion at the time of its extrusion molding. Accordingly, when the resin is applied to a retardation film in which alignment control is performed, the film is produced by a solvent cast method. In general, when light is incident into a substance having birefringence property, the light is divided into two light beams having vibrating directions perpendicular to each other, and the rates at which the light beams travel differ from each other, so an image formation point shifts from the expected one. The polycarbonate resin has been frequently used also in a base film for a diffusion film or lens film, but often involves, for example, the following problem: the image-forming performance of the base film reduces owing to the birefringence property of the resin, so color unevenness or bleeding occurs. In view of the foregoing, the birefringence of the resin is reduced by lowering the line speed of a molding machine upon production of the base film for a diffusion film.

However, the method causes a remarkable reduction in productivity of the base film, and involves, for example, the following problems: an increase in cost for the production and an insufficient ability to supply the resin to the molding machine. In addition, when a styrene/acrylic copolymer out of the compatibilization techniques described in Patent Document 2 is used, the dispersing performance of the syndiotactic polystyrene-based resin can be improved, but the copolymer involves the following problems: there arises a difference in refractive index between the aromatic polycarbonate resin and the syndiotactic polystyrene-based resin, and an increase in addition amount of the copolymer reduces the transparency of the binary system formed of the resins.

Patent Document 1: JP 2004-210915 A
Patent Document 2: JP 2004-210916 A

DISCLOSURE OF THE INVENTION

Problems to be Solved by the Invention

An object of the present invention is to provide an aromatic polycarbonate resin composition with improved transparency and improved extrusion stability.

Means for Solving the Problems

The inventors of the present invention have made extensive studies with a view to achieving the above object. As a result, the inventors have found that an aromatic polycarbonate resin composition capable of achieving the above object can be obtained by blending a specific compatibilizer at a predetermined ratio into a resin composition including an aromatic polycarbonate resin and a styrene-based resin. Thus, the inventors have arrived at the present invention.

That is, the present invention provides the following aromatic polycarbonate resin composition and molded body:

1. an aromatic polycarbonate resin composition including, with respect to 100 parts by mass of a resin mixture including 60 to 99 mass % of (A) an aromatic polycarbonate resin and 1 to 40 mass % of (B) a styrene-based resin, 1 to 30 parts by mass of (C) a compatibilizer, in which the compatibilizer includes a block or random copolymer constituted of an aromatic vinyl monomer unit represented by the following general formula (I) and an acrylate-based monomer unit represented by the following general formula (II):

[Chem 1]

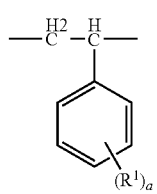

(I)

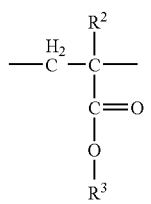

(II)

where $R^1$ represents a halogen atom, or a substituent containing one or more kinds selected from a carbon atom, an oxygen atom, and a silicon atom, a represents an integer of 0 to 5, $R^2$ represents an alkyl group having 1 to 3 carbon atoms, and $R^3$ represents an aryl group represented by the following general formula (III), provided that, when multiple $R^1$'s are present, the multiple $R^1$'s may be identical to or different from each other;

[Chem 2]

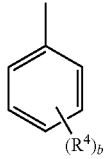

(III)

where $R^4$ represents a halogen atom, or a substituent containing one or more kinds selected from a carbon atom, an oxygen atom, and a silicon atom, and b represents an integer of 0 to 5, provided that, when multiple $R^4$'s are present, the multiple $R^4$'s may be identical to or different from each other;

2. the aromatic polycarbonate resin composition according to the item 1, in which the styrene-based resin includes a styrene-based (co)polymer having a syndiotactic structure;

3. the aromatic polycarbonate resin composition according to the item 2, in which the styrene-based (co)polymer having a syndiotactic structure includes a homopolymer of styrene or a copolymer of styrene and p-methylstyrene;

4. a molded body for optical use obtained by molding the aromatic polycarbonate resin composition according to any one of the items 1 to 3; and 5. a light diffusion film including a light diffusion layer on at least one surface of a film obtained by molding the aromatic polycarbonate resin composition according to any one of the items 1 to 3.

Effect of the Invention

According to the present invention, there can be provided an aromatic polycarbonate resin composition having the following characteristics: the dispersing performance of a styrene-based resin in a resin mixture including an aromatic polycarbonate resin and the styrene-based resin is improved, and the composition shows improved transparency and improved extrusion stability.

BEST MODE FOR CARRYING OUT THE INVENTION

Hereinafter, the present invention is described in detail.

An aromatic polycarbonate resin composition of the present invention is characterized by including, with respect to 100 parts by mass of a resin mixture including 60 to 99 mass %, preferably 65 to 95 mass %, or more preferably 70 to 90 mass % of (A) an aromatic polycarbonate resin and 1 to 40 mass %, preferably 5 to 35 mass %, or more preferably 10 to 30 mass % of (B) a styrene-based resin, 1 to 30 parts by mass, preferably 3 to 25 parts by mass, or more preferably 5 to 20 parts by mass of (C) a compatibilizer, in which the compatibilizer is a block or random copolymer constituted of an aromatic vinyl monomer unit represented by the following general formula (I) and an acrylate-based monomer unit represented by the following general formula (II):

[Chem 3]

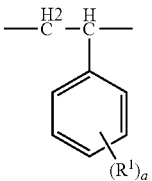

(I)

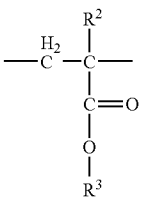

(II)

where $R^1$ represents a halogen atom, or a substituent containing one or more kinds selected from a carbon atom, an oxygen atom, and a silicon atom, a represents an integer of 0 to 5, $R^2$ represents an alkyl group having 1 to 3 carbon atoms, and $R^3$ represents an aryl group represented by the following formula (III); provided that, when multiple $R^1$'s are present, the multiple $R^1$'s may be identical to or different from each other;

[Chem 4]

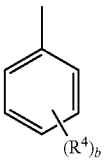

(III)

where $R^4$ represents a halogen atom, or a substituent containing one or more kinds selected from a carbon atom, an oxygen atom, and a silicon atom, and b represents an integer of 0 to 5; provided that, when multiple $R^4$'s are present, the multiple $R^4$'s may be identical to or different from each other.

In the aromatic polycarbonate resin composition of the present invention, when the content of (A) the aromatic polycarbonate resin in the resin mixture including (A) the aromatic polycarbonate resin and (B) the styrene-based resin is less than 60 mass %, a polycarbonate film obtained by molding the composition shows reduced toughness; when the content exceeds 99 mass %, it becomes difficult to reduce the birefringence of the composition. When the content of (B) the styrene-based resin in the resin mixture is less than 1 mass %, it becomes difficult to reduce the birefringence; when the content exceeds 40 mass %, a polycarbonate film obtained by molding the composition shows reduced toughness. In addition, when the amount of (C) the compatibilizer with respect to 100 parts by mass of the resin mixture including the components (A) and (B) is less than 1 part by mass, compatibility between the components (A) and (B) becomes insufficient, so a polycarbonate film obtained by molding the composition shows reduced toughness, and furthermore, causes laminar peeling in its thickness direction; when the compatibilizer is blended in an amount exceeding 30 parts by mass, the composition shows a reduced viscosity at the time of its molding into a film, and a drawdown becomes large.

In general, (A) the aromatic polycarbonate resin used in the aromatic polycarbonate resin composition of the present invention can be easily produced by a reaction between any one of the aromatic, divalent hydroxy compounds (bisphenols) and a carbonate precursor, and can be represented by the following general formula.

[Chem 5]

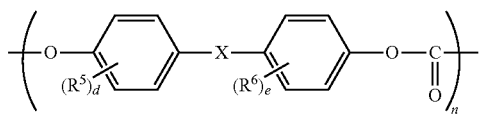

In the formula:

$R^5$ and $R^6$ each represent a halogen atom (such as chlorine, bromine, fluorine, or iodine), an alkoxy group, an ester group, a carboxyl group, a hydroxyl group, an alkyl group having 1 to 8 carbon atoms, or an aromatic group having a hydrogen atom or an alkyl group on an aromatic ring having a total of 6 to 20 carbon atoms, and may each be bonded to any one of the o- and m-positions;

when multiple $R^5$'s are present, the multiple $R^5$'s may be identical to or different from each other;

when multiple $R^6$'s are present, the multiple $R^6$'s may be identical to or different from each other;

d and e each represent an integer of 0 to 4;

n, which is not particularly limited, generally represents 10 to 400; and

X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a —S—, —SO—, —SO$_2$—, —O—, or —CO— bond, or a divalent hydrocarbon group represented by the following general formula.

[Chem 6]

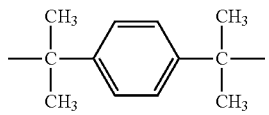

Examples of the aromatic, divalent hydroxy compounds (bisphenol) as a reactive material for producing an aromatic polycarbonate resin preferably include: bis(4-hydroxyphenyl) compounds such as 2,2-bis(4-hydroxyphenyl)propane [bisphenol A], 1,1-bis(4-hydroxyphenyl)methane, 1,1-bis(4-hydroxyphenyl)ethane, hydroquinone, 4,4'-dihydroxybiphenyl, bis(4-hydroxyphenyl)cycloalkane, bis(4-hydroxyphenyl)sulfone, bis(4-hydroxyphenyl)sulfide, bis(4-hydroxyphenyl)sulfoxide, bis(4-hydroxyphenyl)ether, and bis(4-hydroxyphenyl)ketone; and halogenated bisphenols such as bis(3,5-dibromo-4-hydroxyphenyl)propane and bis(3,5-dichloro-4-hydroxyphenyl)propane. In addition, when those compounds have alkyl groups as substituents, an alkyl group having 1 to 6 carbon atoms is preferable and an alkyl group having 1 to 4 carbon atoms is particularly preferable. In addition, a branched polycarbonate obtained by combining one of those aromatic, divalent hydroxy compounds with an aromatic polyvalent hydroxy compound may also be used. Note that the terminal structure of the molecule is not particularly regulated.

Next, the styrene-based monomers as raw materials for the production of (B) the styrene-based resin which is used in the aromatic polycarbonate resin composition of the present invention are styrene and styrene derivatives. Here, as the styrene-based monomers, various monomers may be given, and a styrene-based monomer represented by the following general formula (IV) may be exemplified as a preferable monomer.

[Chem 7]

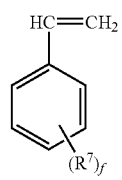

(IV)

In the formula, $R^7$ represents a halogen atom, or a substituent containing one or more kinds of a carbon atom, an oxygen atom, and a silicon atom, and f represents an integer of 0 to 5; provided that, when multiple $R^7$'s are present, the multiple $R^7$'s may be identical to or different from each other.

In the styrene-based monomer represented by the general formula (IV), $R^7$ represents anyone of the various substituents as described above. Examples of the halogen atom include chlorine, fluorine, bromine, and iodine. In addition, a substituent containing a carbon atom is specifically, for example, an alkyl group having 1 to 20 carbon atoms such as a methyl group, an ethyl group, an isopropyl group, or a tertiary butyl group, or a halogen-substituted alkyl group having 1 to 20 carbon atoms such as a chloroethyl group or a bromoethyl group. Further, a substituent containing a carbon atom and a silicon atom is specifically, for example, an alkylsilyl group having 1 to 20 carbon atoms such as a trimethylsilyl group.

Specific examples of the styrene-based monomer include: styrene; alkyl styrenes such as p-methylstyrene, o-methylstyrene, m-methylstyrene, 2,4-dimethylstyrene, 2,5-dimethylstyrene, 3,4-dimethylstyrene, 3,5-dimethylstyrene, and p-tertiary butylstyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene. In order to obtain the styrene-based resin used in the present invention, one kind of the above styrene-based monomers may be used for polymerization or two or more of them may be used for copolymerization. In the resin composition of the present invention, a styrene-based (co)polymer having an atactic, syndiotactic, or isotactic structure, which is obtained by (co)polymerizing the styrene-based monomers, is preferably used.

To be specific, a homopolymer of styrene or a copolymer of styrene and p-methylstyrene is preferably used as the styrene-based resin used in the present invention. In addition, in the present invention, from the viewpoint of the production of a molded body for optical use from the aromatic polycarbonate resin composition, a transparent styrene-based resin having a total light transmittance of 80% or more is preferably used when film molding is performed with the styrene-based resin alone.

Next, (C) the compatibilizer used in the present invention is described.

The compatibilizer used in the present invention is a block or random copolymer constituted of an aromatic vinyl monomer unit represented by the following general formula (I) and an acrylate-based monomer unit represented by the following general formula (II).

[Chem 8]

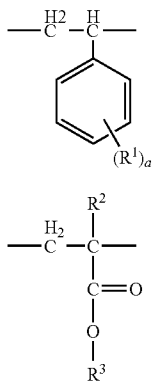

(I)

(II)

where $R^1$ represents a halogen atom, or a substituent containing one or more kinds selected from a carbon atom, an oxygen atom, and a silicon atom; a represents an integer of 0 to 5; $R^2$ represents an alkyl group having 1 to 3 carbon atoms; and $R^3$ represents an aryl group represented by the following general formula (III). However, multiple $R^1$'s are present, $R^1$'s may be identical to or different from each other.

Here, chlorine, fluorine, bromine, and iodine are exemplified as halogen atoms for $R^1$. In addition, specific examples of the substituent containing a carbon atom include alkyl groups having 1 to 20 carbon atoms such as a methyl group, an ethyl group, an isopropyl group, and a tertiary butyl group, and halogen-substituted alkyl groups having 1 to 20 carbon atoms such as a chloroethyl group and a bromoethyl group. Further, specific examples of the substituent containing a carbon atom and a silicon atom include alkyl silyl groups having 1 to 20 carbon atoms such as a trimethyl silyl group. Specific examples of $R^2$ include a methyl group, an ethyl group, an n-propyl group, and an isopropyl group.

[Chem 9]

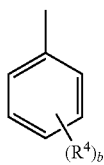

(III)

where $R^4$ represents a halogen atom, or a substituent containing one or more kinds selected from a carbon atom, an oxygen atom, and a silicon atom; and b represents an integer of 0 to 5. However, multiple $R^4$'s are present, $R^4$'s may be identical to or different from each other.

Here, chlorine, fluorine, bromine, and iodine are exemplified as halogen atoms for $R^4$. In addition, specific examples of the substituent containing a carbon atom include alkyl groups having 1 to 20 carbon atoms such as a methyl group, an ethyl group, an isopropyl group, and a tertiary butyl group, and halogen-substituted alkyl groups having 1 to 20 carbon atoms such as a chloroethyl group and a bromoethyl group. Further, specific examples of the substituent containing a carbon atom and a silicon atom include alkyl silyl groups having 1 to 20 carbon atoms such as a trimethyl silyl group.

Examples of the aromatic-based vinyl monomer as a raw material for the aromatic vinyl monomer unit represented by the general formula (I) include styrene, alkyl styrenes such as methylstyrene, ethylstyrene, and tertiary butyl styrene, and halogenated styrenes such as bromonated styrene. Of those, styrene and p-methylstyrene are preferable.

Examples of the acrylate-based monomer as a raw material for the acrylate-based monomer unit represented by the general formula (II) include phenyl methacrylate, phenyl ethacrylate, phenyl propylacrylate, methylphenyl methacrylate, bromophenyl methacrylate, and chlorophenyl methacrylate. Of those, phenyl methacrylate is preferable.

A molar ratio between the aromatic vinyl monomer unit represented by the general formula (I) and the acrylate-based monomer unit represented by the general formula (II) is typically about 50:50 to 99:1, preferably 60:40 to 95:5, or more preferably 60:40 to 90:10.

In addition, (C) the compatibilizer to be used has a melt index (MI) of preferably about 30 to 200 g/10 minutes (at a load of 2.16 kg and 280° C.), more preferably about 40 to 180 g/10 minutes, or still more preferably about 50 to 150 g/10 minutes from the viewpoint of a balance between an improvement in flowability of the aromatic polycarbonate resin composition and the mechanical strength of the composition.

As required, (D) a light fastness agent, (E) an acrylic resin, (F) a phosphorus-based stabilizer, and (G) an organopolysiloxane described below can be further blended into the aromatic polycarbonate resin composition of the present invention.

The light fastness agent as the component (D) in the aromatic polycarbonate resin composition of the present invention is a UV absorber having a maximum wavelength in its UV absorption spectrum of 290 to 330 nm. The light fastness agent is preferably one selected from a malonate-based compound, an oxalylanilide-based compound, and an acrylic polymer having a side chain with a benzotriazole-based skeleton. One kind of them may be used alone, or two or more kinds of them may be used in combination.

Examples of the malonate-based compound include benzilidene bisdiethyl malonate, and 4-methoxyphenyl-methylene-dimethyl ester. Examples of the oxalylanilide-based compound include oxalylanilide compounds having 1 to 12 carbon atoms. Examples of the acrylic polymer containing a side chain having a benzotriazole-based skeleton include a compound in which a 2-(5-t-octyl-2-hydroxyphenyl)benzotriazole group is bound to a polymethyl methacrylate (PMMA) side chain.

The light fastness agent as the component (D) is blended in an amount of typically about 0.05 to 5 parts by mass, preferably 0.1 to 3 parts by mass, or more preferably 0.3 to 2 parts by mass with respect to 100 parts by mass of the resin mixture including (A) the aromatic polycarbonate resin and (B) the styrene-based resin. When the amount of the light fastness agent is 0.05 part by mass or more, the composition exerts good light fastness; when the amount is 5 parts by mass or less, the composition maintains its initial color tone.

The acrylic resin as the component (E) used in the present invention refers to a polymer having a monomer unit of (meth) acrylic acid, (meth)acrylate, (meth)acrylonitrile, and a derivative thereof as a repeating unit, and refers to a single polymer or a copolymer with styrene, butadiene, or the like. Specific examples thereof include polyacrylic acid, polymethyl methacrylate (PMMA), polyacrylonitrile, an ethyl acrylate-acrylic acid-2-chloroethyl copolymer, an acrylic acid-n-butyl-acrylonitrile copolymer, an acrylonitrile-styrene copolymer, an acrylonitrile-butadiene copolymer, and an acrylonitrile-butadiene-styrene copolymer. Of those, in particular, polymethylmethacrylate (PMMA) may be suitably used. The polymethyl methacrylate may be a known one, and in general, is obtained by block polymerization of a methyl methacrylate monomer under a polymerization initiator such as peroxide or an azo-based one.

The acrylic resin as the component (E) is blended in an amount of typically about 0.001 to 5 parts by mass, preferably 0.01 to 2 parts by mass, or more preferably 0.05 to 1 part by mass with respect to 100 parts by mass of the resin mixture including (A) the aromatic polycarbonate resin and (B) the styrene-based resin. When the amount of the acrylic resin is 0.01 part by mass or more, the light-guiding performance of the aromatic polycarbonate resin as a base resin matrix is good, so the luminance does not reduce; when the amount is 1 part by mass or less, the composition can be prevented from becoming opaque owing to the phase separation of the acrylic resin component, and the light-guiding performance of the aromatic polycarbonate resin as a base resin matrix is good, so the luminance does not reduce. In addition, the acrylic resin has a viscosity average molecular weight of typically about 1,000 to 200,000, preferably 5,000 to 150,000, or more preferably 10,000 to 100,000 from the viewpoint of its compatibility with the aromatic polycarbonate resin as a base resin matrix.

Blending the phosphorus-based stabilizer as the component (F) into the aromatic polycarbonate resin composition of the present invention can improve the heat stability of the aromatic polycarbonate resin composition at the time of its molding. The phosphorus-based stabilizer is a compound selected from phosphorus-based compounds and aromatic phosphine compounds, and one kind of them may be used alone, or two or more kinds of them may be used in combination. Examples of the phosphorus-based compound include phosphorous acid, phosphoric acid, phosphonous acid, phosphonic acid, and esters thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecylmonophenyl phosphite, dioctylmonophenyl phosphite, diisopropyl monophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, dibutyl phosphate, dioctyl phosphate, diisopropyl phosphate, 4,4'-biphenylene diphosphinic acid tetrakis(2,4-di-t-butylphenyl), dimethyl benzene phosphonate, diethyl benzene phosphonate, and dipropyl benzene phosphonate. Of those, tris(nonylphenyl)phosphite, trimethyl phosphate, tris(2,4-di-tert-butylphenyl)phosphite, and dimethyl benzene phosphonate are preferably used.

As an aromatic phosphine compound of phosphorous-based stabilizer as the component (F) used in the present invention, exemplified is an aromatic phosphine compound represented by the following general formula (I)

$$P-(X)_3 \qquad (1)$$

where X's each represent a hydrocarbon group and at least one of X's represent an aryl group having 6 to 18 carbon atoms which may have a substituent.

Specific examples thereof include triphenyl phosphine, diphenylbutyl phosphine, diphenyloctadecyl phosphine, tris-(p-tolyl)phosphine, tris-(p-nonylphenyl)phosphine, tris-(naphthyl)phosphine, diphenyl-(hydroxymethyl)-phosphine, diphenyl-(acetoxymethyl)-phosphine, diphenyl-(β-ethylcarboxyethyl)-phosphine, tris-(p-chlorophenyl)phosphine, tris-(p-fluorophenyl)phosphine, diphenylbenzyl phosphine, diphenyl-β-cyanoethyl phosphine, diphenyl-(p-hydroxyphenyl)-phosphine, diphenyl-1,4-dihydroxyphenyl-2-phosphine, and phenylnapthylbenzyl phosphine. In particular, triphenylphosphine is suitably used.

The phosphorus-based stabilizer as the component (F) is blended in an amount of typically about 0.001 to 1 part by mass, preferably 0.005 to 0.8 part by mass, or more preferably 0.008 to 0.5 part by mass with respect to 100 parts by mass of the resin mixture including (A) the aromatic polycarbonate resin and (B) the styrene-based resin. When the amount is 0.001 part by mass or more, the heat stability of the aromatic polycarbonate resin composition at the time of its molding is improved; when the amount is 1 part by mass or less, a balance between the effect and economical efficiency of the composition is improved.

The organopolysiloxane as the component (G) used in the present invention has at least one kind of a group selected from an alkoxy group, a vinyl group, a phenyl group, and a diphenyl group, and is, for example, a reactive silicone-based compound obtained by introducing at least one kind of a group out of a methoxy group, a vinyl group, a phenyl group, and a diphenyl group into a silicone-based compound. The organopolysiloxane is blended as required.

The above component (G) is blended as a stabilizer for the aromatic polycarbonate-based resin for preventing the yellowing of the aromatic polycarbonate resin composition due to heat deterioration at the time of its molding, an external appearance failure of the composition such as a silver streak, and the inclusion of air bubbles in the composition.

The loading of the above component (G) can be appropriately selected from the range of typically about 0.01 to 1 part by mass, preferably 0.03 to 0.8 part by mass, or more preferably 0.05 to 0.5 part by mass with respect to 100 parts by mass of the resin mixture including (A) the aromatic polycarbonate resin and (B) the styrene-based resin. When the loading is 0.01 part by mass or more, the above effect of blending the component is sufficiently exerted; when the loading is 1 part by mass or less, an article molded out of the composition does not undergo, for example, haze.

A method involving blending and kneading each component may be a general method. The kneading is performed by a method using, for example, a ribbon blender, a Henschel mixer, a Banbury mixer, a drum tumbler, a single-screw extruder, a twin-screw extruder, a cokneader, or a multi-screw extruder. Heating temperature in the kneading is generally about 280 to 320° C.

A method of molding a molded body for optical use of the present invention out of the aromatic polycarbonate resin composition, which is not particularly limited, is preferably injection molding. In the case of the injection molding, the composition is typically molded at a cylinder temperature of about 260 to 320° C. and a die temperature of about 50 to 120° C. In order that a molded body having high transparency may be obtained, the composition is desirably quenched so that a phase separation between the aromatic polycarbonate resin and the styrene-based resin may be prevented from occurring; in addition, the die temperature is preferably set to a lower value.

Next, a base film used in a light diffusion film of the present invention is molded out of the materials for the above composition by: drying the materials at about 120 to 140° C. for about 2 to 10 hours; extruding the dried products with an extruder having a devolatilizing apparatus; and molding the extruded product at a die temperature of about 200 to 260° C. and cooling roll temperatures of about 80 to 180° C. into the film.

Here, the materials are dried under the following conditions: the materials are preferably dried at 130 to 140° C. for 2 to 10 hours, or are more preferably dried at 130 to 140° C. for 4 to 10 hours. The materials can be dried under a general atmosphere such as heated air, dry air, or a vacuum. The drying can remove moisture in the materials and most of the volatile reaction by-products produced upon combination of the materials.

In addition, an extruder for the film molding is preferably equipped with a devolatilizing apparatus. The devolatilizing apparatus can reduce the pressure around the materials in molten states to atmospheric pressure or less; the apparatus reduces the pressure to 8 kPa or less, or preferably 4 kPa or less at the time of the extrusion of the materials. The devolatilization under reduced pressure can remove not only moisture remaining in the materials and the volatile reaction by-products produced upon combination of the materials but also secondary, volatile reaction by-products produced by the extrusion molding. Here, when the drying of the materials and the devolatilization at the time of the extrusion molding are insufficient, the resultant sheet foams or its surface state becomes rough, so the optical characteristic (transmittance) of the sheet is apt to reduce.

In addition, the die temperature in the molding for the base film is typically about 200 to 260° C., preferably 200 to 250° C., or more preferably 200 to 240° C. When the die temperature exceeds 260° C., the film is apt to show a degraded color tone in association with its heat deterioration.

Further, the cooling rolls each have a temperature of typically about 80 to 180° C., or preferably 90 to 150° C. at the time of the film molding. Here, when all the rolls each have a temperature of lower than 80° C., the film insufficiently adheres to the rolls, so the film shows reduced surface smoothness, and is apt to undergo an external appearance failure such as haze. In addition, when all the rolls each have a temperature in excess of 180° C., the productivity of the film reduces; furthermore, the film sticks and adheres to the rolls, so the adhesion and uneven peeling of the surface of the film occur, and hence a film having a good optical characteristic is hardly obtained. The thickness of the base film is adjusted to typically 30 to 1,000 µm, or preferably about 50 to 500 µm.

A light diffusion layer of which the light diffusion film of the present invention is constituted has a diffuse reflection function for light. The diffuse reflection of light can be realized by dispersing particles having an average particle diameter of 1 to 20 µm, preferably 1 to 15 µm, or more preferably 3 to 15 µm selected from organic and inorganic particles in the light diffusion layer. When the average particle diameter is less than 1 µm, the diffuse reflection effect on light is insufficient; in addition, when the average particle diameter exceeds 20 µm, the surface of the layer is roughened to a larger extent than is necessary, or the particles are apt to fall off.

Examples of the organic particles include acrylic crosslinking particles and styrene-based crosslinking particles; out of them, the acrylic crosslinking particles and the styrene-based crosslinking particles are preferable. Commercially available products of the acrylic crosslinking particles are, for example, an MBX (trade name, manufactured by SEKISUI PLASTICS CO., LTD.). Examples of the inorganic particles include silica, titanium oxide, alumina, zinc oxide, barium sulfate, calcium carbonate, zeolite, kaolin, and talc; out of them, silica and titanium oxide are preferable. A commercially available product of silica is, for example, a Mizukasil (trade name, manufactured by MIZUSAWA INDUSTRIAL CHEMICALS, LTD.). One kind of those particles may be used alone, or two or more kinds of them may be used as a mixture.

The content of those particles in the light diffusion layer is preferably 0.5 to 50 mass %, or more preferably 5 to 20 mass % in terms of diffuse reflecting performance for light.

In the present invention, the organic particles and/or the inorganic particles are preferably dispersed in a resin component before their use in order that the ease with which the light diffusion layer containing the organic particles and/or the inorganic particles is formed may be improved. That is, a liquid prepared by dissolving the resin component and dispersing the organic particles and/or the inorganic particles in the solution, or a mixed liquid prepared by separately dissolving or dispersing the resin component, and the organic particles and/or the inorganic particles in solvents in advance and mixing the resultant liquids is preferably used as an application liquid. In those cases, one or more kinds of solvents selected from water and organic solvents have only to be appropriately used.

The resin component to be mixed with the organic particles and/or the inorganic particles is not particularly limited. Examples thereof include a polyester-based resin, a polyurethane-based resin, an acrylic resin, a methacrylic resin, a polyamide-based resin, a polyethylene-based resin, a polypropylene-based resin, a polyvinyl chloride-based resin, a polyvinylidene chloride-based resin, a polystyrene-based resin, a polyvinyl acetate-based resin, a fluorine-based resin. One kind of those resins may be used alone, or two or more kinds of them may be used in combination. Of the above resin components, an acrylic resin and a methacrylic resin are preferably used in the present invention.

In the present invention, an acrylic resin or methacrylic resin obtained by copolymerizing a light stabilizer component and/or a UV absorber component is preferably used in a light-fast layer. At the time of the copolymerization, the light stabilizer component and/or the UV absorber component, and an acryl monomer component or methacryl monomer component are preferably copolymerized.

Although the above light diffusion layer containing the organic particles and/or the inorganic particles may be directly provided on the above base film, when adhesiveness is insufficient, the light diffusion layer is preferably provided after the surface of the base film has been subjected to a corona discharge treatment or an undercoating treatment. The undercoating treatment may be performed by a method (inline coating method) involving providing an undercoat during the production process for the above film, or may be performed by a method (offline coating method) involving separately applying an undercoat liquid to provide the undercoat after the production of the base film. Materials used in the undercoating treatment are not particularly limited, and have only to be appropriately selected; for example, a copolymerized polyester resin, a polyurethane resin, an acrylic resin, a methacrylic resin, and various coupling agents are suitable.

When the light diffusion layer is provided on the base film, the application liquid can be applied by an arbitrary method. An employable method is, for example, gravure coating, roll coating, spin coating, reverse coating, bar coating, screen coating, blade coating, air knife coating, or dipping. After having been applied, the application liquid is dried with, for example, a hot-air oven at typically 80 to 120° C. In addition, in the case where the light diffusion layer is cured after the application, a known method can be adopted. For example, a heat curing method, a method for curing with an active ray such as ultraviolet light, an electron beam, or radiation, and a curing method as a result of the combination of these methods are applicable. In that case, a curing agent such as a crosslinking agent is preferably used in combination with the application liquid. In addition, the application liquid for the formation of the light diffusion layer may be applied at the time of the production of the base film (inline coating), or may be applied onto the base film in which crystal alignment has been completed (offline coating).

The light diffusion film of the present invention obtained as described above is such that the light diffusion layer capable of diffuse reflection of light is provided on at least one surface of the base film. The thickness of the light diffusion layer must be 0.5 to 20 μm, and is preferably 1 to 15 μm, or more preferably 2 to 10 μm. When the thickness of the light diffusion layer is less than 0.5 μm, the diffuse reflecting performance of the light diffusion layer for light becomes insufficient; when the thickness of the light diffusion layer exceeds 20 μm, the high reflecting characteristic of the light diffusion film is inhibited.

EXAMPLES

The present invention is described more specifically by way of examples and comparative examples. However, the present invention is by no means limited by these examples.

Hereinafter, the following are used in examples and comparative examples below as the (A) aromatic polycarbonate resin, (B) styrene-based resin, and the (C) compatibilizer.

(A) Aromatic Polycarbonate Resin
PC1: aromatic polycarbonate resin (TARFLON A2200, manufactured by Idemitsu Kosan Co., Ltd.)
(B) Styrene-Based Resin
SPS1: copolymer having 7 mol % of p-methylstyrene (syndiotactic), XAREC142ZE (manufactured by Idemitsu Kosan Co., Ltd.) (total light transmittance of a 100-μm film: 89%)
SPS2: copolymer having 12 mol % of p-methylstyrene (syndiotactic), XAREC201AE (manufactured by Idemitsu Kosan Co., Ltd.) (total light transmittance of a 100-μm film: 89%)
SPS3: styrene homopolymer (syndiotactic), XAREC130ZC (manufactured by Idemitsu Kosan Co., Ltd.) (total light transmittance of a 100-μm film: 88%)
APS1: styrene homopolymer (atactic), HH203 (manufactured by PS Japan), melt index (MI)=3.3 g/10 minutes (at a load of 5 kg and 200° C.) (total light transmittance of a 100-μm film: 90%)
(C) Compatibilizer
Comp1: styrene/phenylmethacrylate copolymer (METABLENE TP003, manufactured by Mitsubishi Rayon Co., Ltd.), MI=100 g/10 minutes (at a load of 2.16 kg and 280° C.), styrene/phenylmethacrylate=89/11 mol %, glass transition point (Tg)=97.8° C.
Comp4: styrene/methylmethacrylate copolymer (MX121, manufactured by PS Japan), melt index (MI)=1.5 g/10 minutes (at a load of 5 kg and 200° C.)
Comp5: styrene/methylmethacrylate copolymer (registered trade mark: MODIPER MS-10B, manufactured by NOF CORPORATION), solution viscosity 2.0 Pa·s (viscosity when 30 mass % of Comp5 is dissolved in a styrene monomer)

It should be noted that methods of measuring and evaluating the various properties of a sheet are as described below.
<Evaluation Methods>
(Transmittance)
Measurement was performed in conformity with the method of measuring a light transmittance described in JIS K7105.

(In-Plane Birefringence)
The in-plane birefringence of the film was determined by measuring refractive indices in the machine direction (MD) and transverse direction (TD) of the film with a MODEL 2010 PRISM COUPLER manufactured by Metricon Corporation.
(Film Width Fluctuation Coefficient)
A standard deviation was determined by measuring widths at 50 points at an interval of 2 cm in the MD of each of cast films produced in the examples and the comparative examples. In this evaluation, as the numerical value increases, a fluctuation in film width increases, which leads to a problem upon production of the product.
(Average Film Width)
An average film width was calculated by measuring widths at 50 points at an interval of 2 cm in the MD of each of the cast films produced in the examples and the comparative examples. In this evaluation, as the numerical value decreases, a drawdown becomes larger, which limits the effective width of the product.

Example 1

First, 3 parts by mass of a compatibilizer (Comp1) were blended into 100 parts by mass of a resin mixture including 90 mass % of an aromatic polycarbonate resin (PC1) and 10 mass % of a styrene-based resin (SPS1), and then the mixture was kneaded with a vented uniaxial extruder at an extrusion temperature of 290° C. As a result, a resin composition was obtained. The composition was molded with a 25-ramp uniaxial cast molding machine having a die width of 150 mm at an extrusion temperature of 270° C., a discharge rate of 3 kg/hr, a cooling roll temperature of 90° C., and a take-off speed of 5 m/min. As a result, a film having a thickness of 100 μm was obtained. In addition, the resultant film was evaluated for various properties. Table 1 shows the results of the evaluation.

Examples 2 to 6 and 10

Film molding was performed in the same manner as in Example 1 except that the respective raw materials to be blended were blended at ratios shown in Table 1. In addition, the resultant films were each evaluated for various properties. Table 1 shows the results of the evaluation.

Example 7

First, 89 parts by mass of styrene and 11 parts by mass of phenyl ethacrylate as monomers, and 1.2 parts by mass of benzoyl peroxide as an initiator were loaded into a 1,000-cm³ Erlenmeyer flask provided with a three way stopcock, and were then mixed for dissolution. As a result, a monomer liquid was prepared. Then, the air in the flask was replaced with a nitrogen gas for about 1 hour. After that, 2,800 g of pure water were poured into the flask, and the temperature of the mixture was increased to 85° C. so that polymerization might be initiated. The polymerization was performed at 85° C. for 6 hours and at 98° C. for 3 hours. A resin thus obtained was dehydrated and dried. As a result, a styrene/phenyl ethacrylate copolymer was obtained (Comp2). The copolymer had a melt index (MI) of 100 g/10 minutes (at a load of 2.16 kg and 280° C.). Film molding was performed in the same manner as in Example 1 except that the above Comp2 was used instead of the Comp1 as a compatibilizer. In addition, the resultant film was evaluated for various properties. Table 1 shows the results of the evaluation.

Example 8

First, 89 parts by mass of styrene and 11 parts by mass of p-methyl phenyl methacrylate as monomers, and 1.2 parts by mass of benzoyl peroxide as an initiator were loaded into a 1,000-cm$^3$ Erlenmeyer flask provided with a three way stopcock, and were then mixed for dissolution. As a result, a monomer liquid was prepared. Then, the air in the flask was replaced with a nitrogen gas for about 1 hour. After that, 2,800 g of pure water were poured into the flask, and the temperature of the mixture was increased to 85° C. so that polymerization might be initiated. The polymerization was performed at 85° C. for 6 hours and at 98° C. for 3 hours. A resin thus obtained was dehydrated and dried. As a result, a styrene/p-methyl phenyl methacrylate copolymer was obtained (Comp3). The copolymer had a melt index (MI) of 90 g/10 minutes (at a load of 2.16 kg and 280° C.). Film molding was performed in the same manner as in Example 1 using Comp3. In addition, the resultant film was evaluated for various properties. Table 1 shows the results of the evaluation.

Example 9

An acrylic resin (ACRYPET MF manufactured by Mitsubishi Rayon Co., Ltd.) was dissolved at a solid concentration of 20 mass % in a mixed solvent containing ethyl acetate and propylene glycol methyl ether at a mass ratio of 1:2. Further, crosslinking acrylic particles (MBX-5 manufactured by SEKISUI PLASTICS CO., LTD. having an average particle diameter of 5 μm) were added to the solution at a content of 10 mass % with respect to the solid content, and were then dispersed by stirring. The resultant dispersion liquid was applied to the surface of a film having a thickness of 100 μm obtained by molding the composition of Example 2 with a bar coater so that the dispersion liquid might have a thickness of 10 μm. Then, the applied liquid was dried in a hot-air oven at 120° C. for 5 minutes. As a result, a diffusion film with its birefringence property reduced was obtained. In addition, the resultant film was evaluated for various properties. Table 1 shows the results of the evaluation.

Comparative Examples 1 to 5

Film molding was performed in the same manner as in Example 1 except that the respective raw materials to be blended were blended at ratios shown in Table 1. In addition, the resultant films were each evaluated for various properties. Table 1 shows the results of the evaluation.

TABLE 1

| | | | Example | | | | | | |
|---|---|---|---|---|---|---|---|---|---|
| | | | 1 | 2 | 3 | 4 | 5 | 6 | 7 |
| Blending composition (parts by mass) | Aromatic polycarbonate resin | (PC1) | 90 | 80 | 70 | 80 | 80 | 80 | 90 |
| | Styrene-based resin | (SPS1) | 10 | 20 | 30 | 20 | | | 10 |
| | | (SPS2) | | | | | 20 | | |
| | | (SPS3) | | | | | | 20 | |
| | | (APS1) | | | | | | | |
| | Compatibilizer | (Comp1) | 3 | 8 | 10 | 20 | 8 | 8 | |
| | | (Comp2) | | | | | | | 3 |
| | | (Comp3) | | | | | | | |
| | | (Comp4) | | | | | | | |
| | | (Comp5) | | | | | | | |
| Test items | Transmittance (%) | | 91.0 | 90.0 | 88.0 | 88.0 | 90.0 | 89.0 | 90.0 |
| | Haze (%) | | 0.5 | 0.5 | 0.8 | 0.8 | 0.5 | 0.5 | 0.5 |
| | In-plane birefringence | | 0.0130 | 0.0100 | 0.0080 | 0.0120 | 0.0100 | 0.0100 | 0.0130 |
| | Film width fluctuation coefficient | | 1.85 | 1.79 | 2.05 | 1.60 | 1.80 | 1.80 | 1.80 |
| | Average film width (mm) | | 102 | 101 | 100 | 98 | 101 | 101 | 101 |

| | | | Example | | | Comparative Example | | | | |
|---|---|---|---|---|---|---|---|---|---|---|
| | | | 8 | 9 | 10 | 1 | 2 | 3 | 4 | 5 |
| Blending composition (parts by mass) | Aromatic polycarbonate resin | (PC1) | 90 | 80 | 90 | 100 | 80 | 80 | 70 | 80 |
| | Styrene-based resin | (SPS1) | 10 | 20 | | | 20 | 20 | 30 | 20 |
| | | (SPS2) | | | | | | | | |
| | | (SPS3) | | | | | | | | |
| | | (APS1) | | | 10 | | | | | |
| | Compatibilizer | (Comp1) | | 8 | 3 | | | | | 50 |
| | | (Comp2) | | | | | | | | |
| | | (Comp3) | 3 | | | | | | | |
| | | (Comp4) | | | | | | | 8 | |
| | | (Comp5) | | | | | | | | 10 |
| Test items | Transmittance (%) | | 90.0 | 88.0 | 91.0 | 92.0 | 89.5 | 70.0 | 85.0 | 90.0 |
| | Haze (%) | | 0.5 | 35.0 | 0.5 | 0.3 | 0.5 | 55.0 | 5.0 | 0.5 |
| | In-plane birefringence | | 0.0130 | 0.0100 | 0.0150 | 0.0200 | 0.0090 | −0.0005 | 0.0100 | 0.0100 |
| | Film width fluctuation coefficient | | 1.80 | 1.79 | 1.85 | 1.78 | 7.76 | 2.54 | 1.8 | 2.00 |
| | Average film width (mm) | | 101 | 101 | 100 | 105 | 92 | 90 | 100 | 70 |

Table 1 shows the following:
(1) as is apparent from a comparison between any one of Examples 1 to 10 and Comparative Example 1, blending a styrene-based resin into an aromatic polycarbonate resin can suppress in-plane birefringence;
(2) as can be seen from a comparison between any one of Examples 1 to 10 and any one of Comparative Examples 2 to 4, the use of a compatibilizer significantly reduces a film width fluctuation coefficient, and furthermore, the use of the styrene/phenyl methacrylate copolymer of the present invention as a compatibilizer improves an average film width and a transmittance, and markedly alleviates haze; and
(3) as can be seen from Comparative Example 5, when the amount of a compatibilizer is excessively large, a drawdown becomes large, and an average film width remarkably reduces.

INDUSTRIAL APPLICABILITY

The aromatic polycarbonate resin composition of the present invention can suitably find use in applications including: light diffusion plates in, for example, a liquid crystal display field; optical elements such as an optical lens, a molded body for optical use, a light-guiding plate (light-guiding body), and a light diffusion film; and alternatives to glass in, for example, a street light cover, a vehicle glass, and a building material glass.

The invention claimed is:
1. A light diffusion film comprising:
a light diffusion layer; and
a base film obtained by molding an aromatic polycarbonate resin composition, comprising:
a resin mixture; and
a compatibilizer (C);
wherein
a content of the compatibilizer (C) is 1 to 30 parts by mass with respect to 100 parts by mass of the resin mixture, and
the resin mixture comprises:
60 to 99 mass % of (A) an aromatic polycarbonate resin; and
1 to 40 mass % of (B) a styrene-resin consisting of a homopolymer or copolymer obtained by polymerizing at least one styrene monomer of formula (IV):

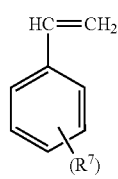

(IV)

wherein
$R^7$ is a halogen atom, or a substituent containing one or more kinds of a carbon atom, an oxygen atom, and a silicon atom, and
f is an integer of 0 to 5;
with the proviso that when multiple $R^7$'s are present, each $R^7$ is independent of each other; and
wherein
the compatibilizer comprises a block or random copolymer obtained by copolymerizing an aromatic vinyl monomer of formula (I) and an acrylate monomer of formula (II):

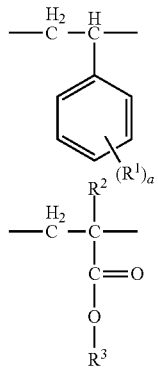

wherein
$R^1$ is a halogen atom, or a substituent containing one or more kinds selected from a carbon atom, an oxygen atom, and a silicon atom,
a is an integer of 0 to 5,
$R^2$ is an alkyl group having 1 to 3 carbon atoms, and
$R^3$ is an aryl group of formula (III), with the proviso that, when multiple $R^1$'s are present, each $R^1$ is independent of one another;

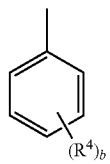

(III)

wherein
$R^4$ is a halogen atom, or a substituent containing one or more kinds selected from a carbon atom, an oxygen atom, and a silicon atom, and
b is an integer of 0 to 5,
with the proviso that, when multiple $R^4$'s are present, each $R^4$ is independent of one another wherein the light diffusion layer is directly applied to at least one surface of the base film or optionally, applied after a corona discharge or undercoating treatment of the base film.

2. The light diffusion film according to claim 1, wherein in the aromatic polycarbonate resin composition, a structure of the styrene-resin homopolymer or copolymer is syndiotactic or atactic.

3. The light diffusion film according to claim 2, wherein the styrene resin comprises a syndiotactic homopolymer of styrene or a syndiotactic copolymer of styrene and p-methylstyrene.

4. The light diffusion film according to claim 1, wherein in the aromatic polycarbonate resin composition, the aromatic polycarbonate resin is of formula (V):

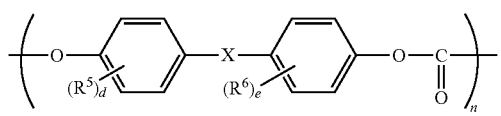

(V)

wherein

R$^5$ and R$^6$ are each independently a halogen atom, an alkoxy group, an ester group, a carboxyl group, a hydroxyl group, an alkyl group having 1 to 8 carbon atoms, or an aromatic group having a hydrogen atom or an alkyl group on an aromatic ring having a total of 6 to 20 carbon atoms, d and e are each independently an integer of 0 to 4;

n is an integer of 10 to 400; and

X is a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a —S—, —SO—, —SO$_2$—, —O—, or —CO— bond, or a divalent hydrocarbon group of formula (VI):

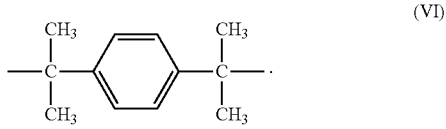

(VI)

5. The light diffusion film according to claim 1, wherein the at least one styrene monomer of formula (IV) is selected from the group consisting of styrene, p-methylstyrene, o-methylstyrene, m-methylstyrene, 2,4-dimethylstyrene, 2,5-dimethylstyrene, 3,4-dimethylstyrene, 3,5-dimethylstyrene, p-tertiary butylstyrene; p-chlorostyrene, m-chlorostyrene, o-chlorostyrene, p-bromostyrene, m-bromostyrene, o-bromostyrene, p-fluorostyrene, m-fluorostyrene, o-fluorostyrene, and o-methyl-p-fluorostyrene.

6. The light diffusion film according to claim 1, wherein a total light transmittance is at least 80%.

7. The light diffusion film according to claim 1, wherein in the aromatic polycarbonate resin composition, a molar ratio of the aromatic vinyl monomer unit of formula (I) and the acrylate-based monomer of formula (II) is from 50:50 to 99:1.

8. The light diffusion film according to claim 1, wherein in the aromatic polycarbonate resin composition, a melt index (MI) of the compatibilizer (C) is about 30 to 200 g/10 minutes at a load of 2.16 kg and 280° C.

9. The light diffusion film according to claim 1, wherein the aromatic polycarbonate resin composition further comprises at least one selected from the group consisting of (D) a light fastness agent, (E) an acrylic resin, (F) a phosphorus stabilizer, and (G) an organopolysiloxane.

10. The light diffusion film according to claim 9, wherein the aromatic polycarbonate resin composition further comprises at least one light fastness agent (D) which is selected from the group consisting of a malonate compound, an oxalylanilide compound, and an acrylic polymer having a side chain with a benzotriazole.

11. The light diffusion film according to claim 9, wherein the aromatic polycarbonate resin composition further comprises at least one acrylic resin (E) which is selected from the group consisting of polyacrylic acid, polymethyl methacrylate (PMMA), polyacrylonitrile, an ethyl acrylate-acrylic acid-2-chloroethyl copolymer, an acrylic acid-n-butyl-acrylonitrile copolymer, an acrylonitrile-styrene copolymer, an acrylonitrile-butadiene copolymer, and an acrylonitrile-butadiene-styrene copolymer.

12. The light diffusion film according to claim 9, wherein the aromatic polycarbonate resin composition further comprises at least one phosphorous stabilizer (F) which is selected from the group consisting of phosphorous acid, phosphoric acid, phosphonous acid, phosphonic acid, and esters thereof.

13. The light diffusion film according to claim 9, wherein the aromatic polycarbonate resin composition further comprises an organopolysiloxane (G) which is a reactive silicone compound comprising at least one group selected from the group consisting of a methoxy group, a vinyl group, a phenyl group, and a diphenyl group.

* * * * *